US010438186B2

(12) United States Patent
Clark et al.

(10) Patent No.: US 10,438,186 B2
(45) Date of Patent: Oct. 8, 2019

(54) PRODUCE WEIGH STATION AND METHOD OF USE

(71) Applicant: Walmart Apollo, LLC, Bentonville, AR (US)

(72) Inventors: Jimmie R. Clark, Fayetteville, AR (US); Christopher Soames Johnson, Pea Ridge, AR (US); Ricky L. Lewis, Rogers, AR (US); Richard Andrew White, Pineville, AR (US)

(73) Assignee: WALMART APOLLO, LLC, Bentonville, AR (US)

(*) Notice: Subject to any disclaimer, the term of this patent is extended or adjusted under 35 U.S.C. 154(b) by 332 days.

(21) Appl. No.: 15/271,468

(22) Filed: Sep. 21, 2016

(65) Prior Publication Data
US 2017/0091748 A1 Mar. 30, 2017

Related U.S. Application Data

(60) Provisional application No. 62/233,589, filed on Sep. 28, 2015.

(51) Int. Cl.
G06Q 20/20 (2012.01)

(52) U.S. Cl.
CPC .................. G06Q 20/208 (2013.01)

(58) Field of Classification Search
None
See application file for complete search history.

(56) References Cited

U.S. PATENT DOCUMENTS 5,426,282 A * 6/1995 Humble .................. A47F 9/047
186/61
2012/0173351 A1* 7/2012 Hanson ............... G06Q 20/204
705/17

(Continued)

FOREIGN PATENT DOCUMENTS

CN 102564551 A 7/2012
CN 102568109 A 7/2012

(Continued)

OTHER PUBLICATIONS

Clark, Sarah, "ShelfX builds NFC into smart shopping shelves", NFCWorld.com, Nov. 14, 2011; 3 pages.

Primary Examiner — Fateh M Obaid
(74) Attorney, Agent, or Firm — Schmeiser, Olsen & Watts LLP; Karen E. Jachimowicz

(57) ABSTRACT

A system for communicating the status of a produce product in a retail store is described. The system includes a produce weigh station and a produce status station. The produce weigh station includes a produce scale and a camera. The produce weigh station uses a captured digital image of the produce product to determine a product type of the produce product being weighed, as well as a product status of the produce product. The produce status can include, for example, whether the produce product is ripe, over-ripe, or under-ripe. The produce weigh station communicates the type of the produce product, the digital image, and the produce status to the produce status station. An employee of the retail store can use the produce status station to receive the produce status information without the employee having to be present in the produce sales department.

6 Claims, 4 Drawing Sheets

(56) References Cited

U.S. PATENT DOCUMENTS

| | | | | |
|---|---|---|---|---|
| 2014/0104413 A1* | 4/2014 | McCloskey | .......... | G06Q 10/083 348/135 |
| 2014/0104416 A1* | 4/2014 | Giordano | ............... | G01B 11/02 348/135 |
| 2014/0293091 A1* | 10/2014 | Rhoads | ................... | G01J 3/513 348/234 |
| 2016/0187199 A1* | 6/2016 | Brunk | ................... | G01J 3/2823 348/89 |

FOREIGN PATENT DOCUMENTS

| | | |
|---|---|---|
| CN | 104019876 A | 9/2014 |
| CN | 204101158 U | 1/2015 |

\* cited by examiner

PRODUCE WEIGH STATION AND METHOD OF USE

CROSS REFERENCE TO RELATED APPLICATION

This invention claims priority to U.S. provisional patent application Ser. No. 62/233,589, filed Sep. 28, 2015 to Applicant Wal-Mart Stores Inc., and entitled "Produce Weigh Station and Method of Use".

BACKGROUND OF THE INVENTION

Technical Field

This invention relates to a scale for weighing produce in a retail store, and specifically to a produce weight station that includes a scale and a camera.

State of the Art

Retail establishments which sell groceries often sell produce such as fruit and vegetables. Produce sections of retail stores present unique challenges as compared to packaged foods. These special challenges include the need to continually monitor the produce to eliminate over-ripe or spoiled produce and replace it with fresh stock, and the need to monitor newly received produce for its readiness for sale. Often, retail store employees spend much of their time visually inspecting the produce to determine its suitability for sale, and to replace over-ripe or spoiled produce with fresh. An additional challenge is that the retail store needs to have a scale located in the produce section for consumers to determine the cost of a produce product, because many produce product costs are based on the weight of the produce. Scales are often located in both the produce section and at registers so that both the customer and the cashier can determine the cost of a produce product. The trend towards self-checkout and electronic scanning and checkout using mobile computing devices complicates the produce purchase because produce does not have an easily-scannable bar code, but instead needs to be weighed and the cost entered manually into the mobile device.

Accordingly, what is needed is a produce weigh station for use in a retail store that weighs produce, determines the cost of the produce, and electronically transfers the cost of the produce into a customer mobile computing device. Also, what is needed is a produce weight station that can help store employees monitor the status of the produce that is being weighed.

DETAILED DESCRIPTION OF EMBODIMENTS OF THE INVENTION

Figure 1:
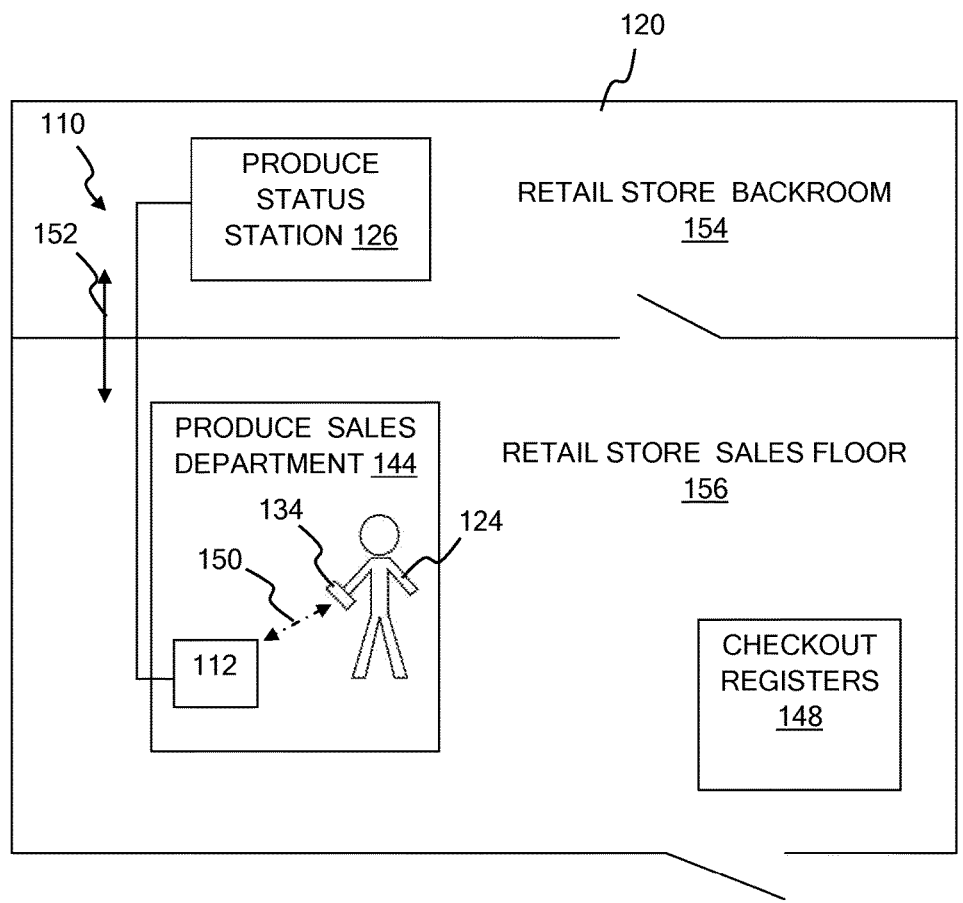
FIG. 1 shows a simplified diagram of an embodiment of a retail store with a system for communicating the status of a produce product.

As discussed above, embodiments of the present invention relate to a scale for weighing produce in a retail store, and specifically to a produce weigh station that includes a scale and a camera. Disclosed is a system for communicating the status of a produce product in a retail store. The system for communicating the status of the produce product includes a produce weigh station and a produce status station. The produce weigh station is placed in the produce sales department of the retail store. The produce status station is placed where an employee of the retail store can access the produce status station to monitor the status of the produce being weighed. The produce status station can be placed in the backroom of the retail store, for example, or may be a mobile device carried by an employee. The produce weigh station includes a produce scale and a camera. The camera captures a digital image of the produce product that a person, such as a customer, has placed on the scale. The produce weigh station uses the captured digital image to determine a product type of the produce product being weighed, as well as a product status of the produce product. The produce status can include, for example, whether the produce product is ripe, over-ripe, or under-ripe. The produce weigh station communicates a type of the produce product and the produce status to the produce status station. In some embodiments, the produce weight station communicates the digital image of the produce product to the produce status station. An employee of the retail store can use the produce status station to receive the produce status information, and determine whether the produce needs to be rotated or removed from the produce sales department, or other action taken. The produce weigh station communicates the product weight and cost to a mobile computing device carried by the customer who weighed the produce product, so the customer can input the product cost into their electronic shopping cart for checkout.

Retail establishments which sell groceries often sell produce such as fruit and vegetables in a produce sales department of the retail store. Produce sales departments of retail stores present unique challenges as compared to the sale of packaged foods. These special challenges include the need to continually monitor the produce to eliminate over-ripe or spoiled produce and replace it with fresh stock, and the need to monitor newly received produce for its readiness for sale. Often, retail store employees spend a considerable amount of time visually inspecting the produce on the produce sales department to determine its suitability for sale and to replace over-ripe or spoiled produce with fresh. The produce sales department, where produce is displayed and sold, is often quite a distance from the retail store backroom where produce employees and managers do much of their work. It would be advantageous if the produce employees of the retail store could have a way to monitor the status of produce in the produce sales department without walking to the produce sales department. It would also be advantageous if there was a way to notify a produce employee when there was produce that needed to be removed or rotated from the produce sales department, such as if there was produce that was over-ripe or getting over-ripe. The disclosed system for communicating the status of a produce product includes a produce weigh station that resides in the produce sales department, and a produce status station which can be placed in the retail store back room, or anywhere else that is convenient for a store employee to monitor for alerts that produce needs attention. The produce weigh station captures and processes digital images of produce being weighed in the produce sales department, and sends images and produce status indicators to the produce status station. This reduces the need for employees to visually inspect produce in the produce sales department, and provides a way to optically inspect and monitor produce without this having to be done by an employee.

An additional challenge of produce sales in a retail store is that the retail store needs to have a scale located in the produce section for consumers to determine the cost of a produce product, because many produce product costs are based on the weight of the produce. Scales are often located in both the produce section and at registers so that both the customer and the cashier can determine the cost of a produce product. The trend towards self-checkout and electronic scanning and checkout using mobile computing devices complicates the produce purchase because produce does not have an easily-scannable bar code. Using a traditional produce scale, the customer places the produce on the scale and observes the weight. Often the customer will have to calculate the cost based on the weight, and manually enter the cost into the mobile device. Even if the scale calculates the cost for the customer, the total cost still needs to be entered into the mobile device manually. The disclosed produce weigh station includes a camera that captures a digital image of the produce product, and a processor that uses the digital image to determine the type and cost of the produce product, and then electronically communicates the product type and the product cost to the mobile computing device of the customer. The customer can easily electronically enter the product type and product cost into their electronic shopping basket, ready for checkout.

FIG. 1 shows a simplified diagram of a retail store 120 that is using a system 110 for communicating the status of a produce product. System 110 for communicating the status of a produce product includes a produce weigh station 112 and a produce status station 126 communicatively coupled via communication 152. Retail store 120 in this embodiment includes a retail store backroom 154, a retail store sales floor 156, and checkout registers 148. Retail store backroom 154 in this embodiment is the area restricted to employees only. Often in this area stock is received, stored, and sorted, for example. Retail store sales floor 156 is where stock is located for sale, and includes, in this embodiment, a produce sales department 144 where produce is displayed for sale. Checkout registers 148 are where customers, such as a customer 124 as shown in FIG. 1, visit to checkout and pay for their purchases. It is to be understood that retail store 120 and its configuration are examples only, and many other retail store 120 configurations can be used with system 110. The retail store 120 configuration shown in FIG. 1 is only one possible configuration and use of system 110 for communicating the status of a produce product. For example, some retails stores 120 have electronic checkout using mobile computing devices such as a mobile computing device 134 carried by customer 124. Thus, some customers 124 may not have to use checkout registers 148 if they use their mobile computing device 134 instead, and it can be envisioned that there may be a time when retail stores 120 may not need checkout registers 148.

Figure 2:
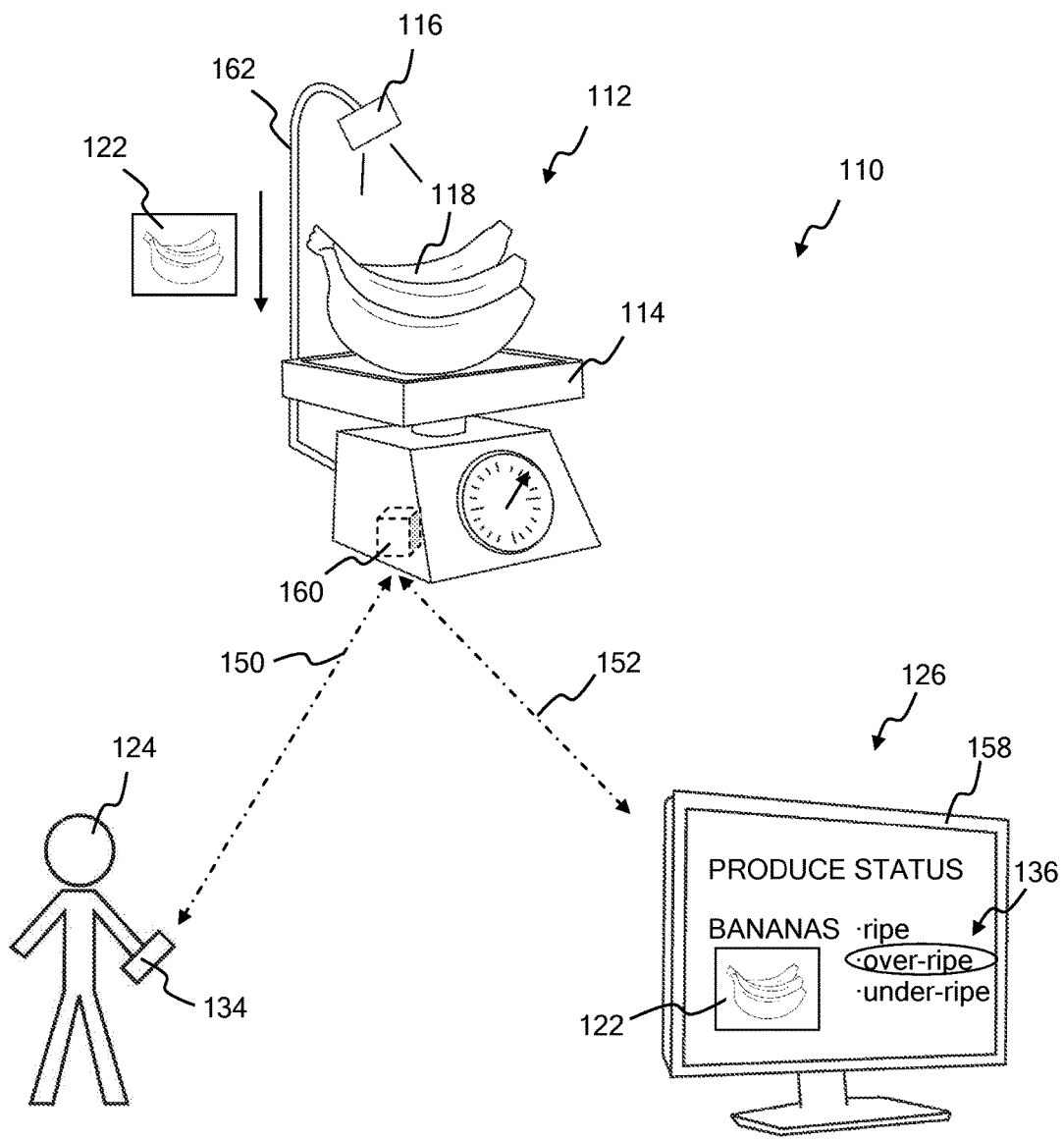
FIG. 2 shows a simplified drawing of a system for communicating the status of a produce product.

System 110 for communicating the status of a produce product includes produce weigh station 112 and produce status station 126, as shown in FIG. 1. Produce weigh station 112 is located in produce sales department 144 and is used by customers or other persons to weigh produce that is for sale in produce sales department 144. In the embodiment shown in FIG. 1, customer 124 is using produce weigh station 112 to weigh a produce product 118 as shown in FIG. 2, where, in this embodiment, produce product 118 is a bunch of bananas. FIG. 2 shows a simplified illustration of one embodiment of system 110 for communicating the status of a produce product of FIG. 1.

Referring back to FIG. 1, produce status station 126 is used by employees of retail store 120 to monitor the status of produce located in produce sales department 144. Produce status station 126 in this embodiment is located in retail store backroom 154, but this is not meant to be limiting. Produce status station 126 can be any type of computing or displaying device, or both, which can provide images of produce being weighed by produce weigh station 112, and/or notifications of the status of produce being weighed by produce weigh station 112. Produce status station 126 can be a fixed computing system, for example, such as a desktop or a server. Produce status station 126 can be a mobile computing system, for example such as a smartphone or a tablet type device. When produce status station 126 is a mobile device, it can be carried around by an employee responsible for monitoring produce, for example. FIG. 2 shows an embodiment of produce status station 126 where produce status station 126 is a monitor 158. In the embodiment of system 110 shown in the FIG. 1 and FIG. 2, produce status station 126 is monitor 158 located in retail store backroom 154 where it can be viewed by employees of store 120.

Figure 3:
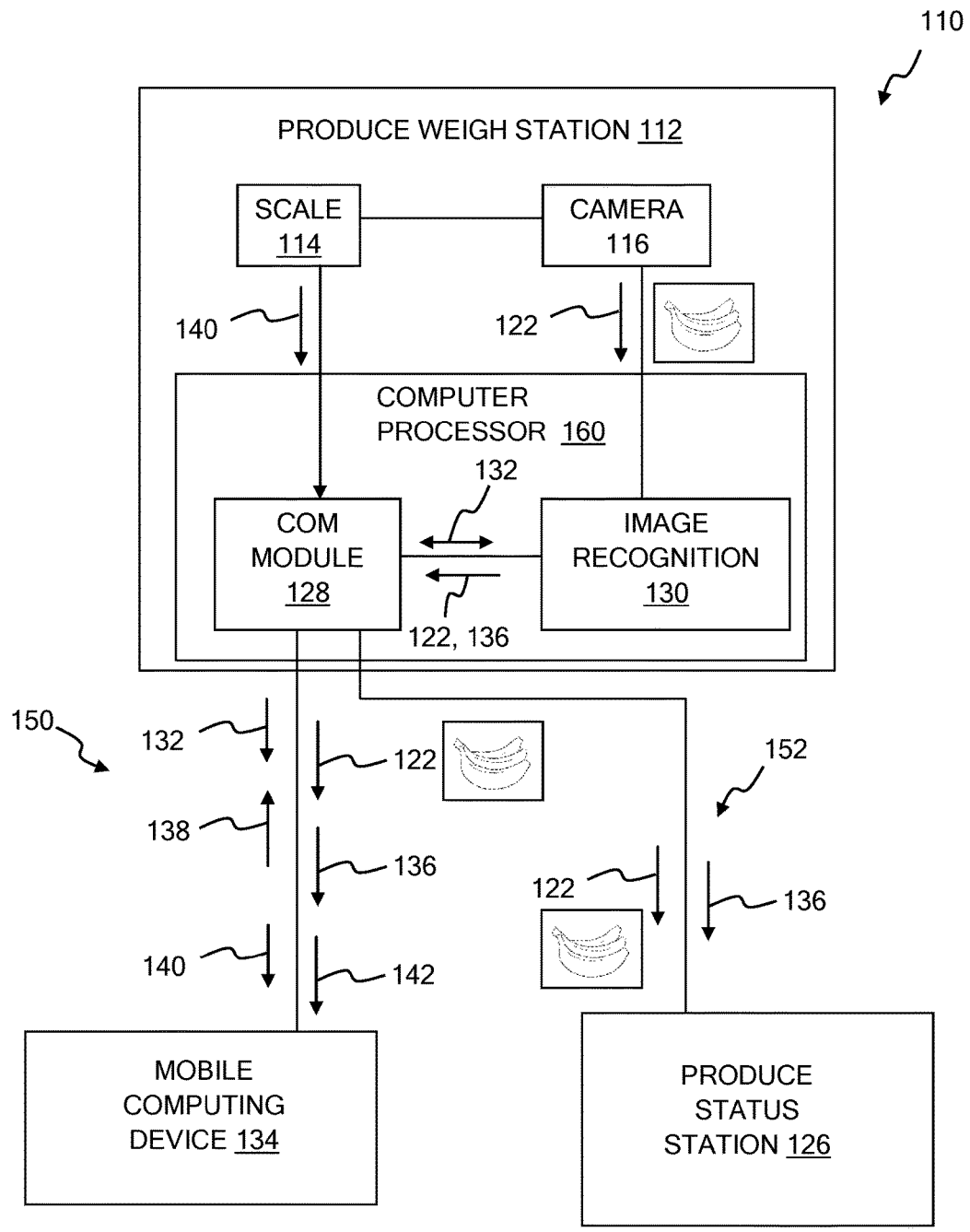
FIG. 3 shows a simplified block diagram of a system for communicating the status of a produce product of FIG. 2.

Produce weigh station 112 includes a produce scale 114 and a camera 116 as shown in FIG. 2 and FIG. 3. FIG. 3 shows a simplified block diagram of system 110 for communicating the status of a produce product of FIG. 2. Produce weigh station 112 is communicatively coupled to computing device 134 carried by customer 124 via communication 150. Communication 150 can be wired or wireless communication. Produce weigh station 112 is communicatively coupled to produce status station 126 via communication 152. Communication 152 can be wired or wireless communication.

Produce scale 114 is used by customers and other people to weigh produce products in produce sales department 144 (FIG. 1). In the embodiment shown in FIG. 2 and FIG. 3, produce scale 114 is being used by customer 124 to weigh produce product 118, which is a bunch of bananas. It is to be understood that produce product 118 can be any produce product including or other than bananas.

Camera 116 captures a digital image 122 of produce product 118 being weighed by produce scale 114. Camera 116 captures digital image 122 of produce product 118 in response to produce product 118 being placed on produce scale 114. Camera 116 is mechanically and communicatively coupled to produce scale 114 in this embodiment. Camera 116 is mechanically coupled to produce scale 114 with camera arm 162, which mechanically holds camera 116 so that camera 116 is viewing produce product 118 on produce scale 114. Camera 116 is communicatively coupled to produce scale 114 in this embodiment with a conductor inside camera arm 162, but this is not meant to be limiting. In some embodiments, camera 116 is communicatively coupled to produce scale 114 with a wireless communication connection. In some embodiments, camera 116 is not mechanically coupled to produce scale 114.

Produce weigh station 112 also includes a computer processor 160. Computer processor 160 receives digital image 122 from camera 116, as shown in FIG. 3. Computer processor 160 outputs a produce type indicator 132 to mobile computing device 134 in response to computer processor 160 receiving digital image 122 from camera 116. Computer processor 160 includes, in this embodiment, a communication module 128, and an image recognition module 130. Computer processor 160 can include many other elements. The specific components and embodiment of computer processor 160 shown in FIG. 3 is an example only.

Computer processor 160 receives digital image 122 from camera 116, and delivers digital image 122 to image recognition module 130. Image recognition module 130 performs image recognition processing on digital image 122 to determine a product type indicator 132 of produce product 118, as well as determining a status of produce product 118, such as whether produce product 118 is ripe, under-ripe, or over-ripe, or whether produce product 118 has other status issues.

Communication module 128 handles communication 152 with produce weigh station 126, and communication 150 with mobile computing device 134. Once customer 124 places produce product 118 onto produce scale 114, camera 116 captures digital image 122 of produce product 118 and delivers digital image 122 to image recognition module 130 of computer processor 160. Image recognition module 130 performs image recognition on digital image 122, and outputs product type indicator 132 when image recognition module 130 has performed an initial product type recognition on digital image 122. Image recognition module 130 delivers product type indicator 132 to communication module 128. Communication module 128 sends product type indicator 132 to mobile computing device 134. Product type indicator 132 is a part of communication 150 between computer processor 160 and mobile computing device 134, which in this embodiment is a wireless communication, but this is not meant to be limiting. Computer processor 160 outputs product type indicator 132 to mobile computing device 134 in response to computer processor 160 receiving digital image 122 of produce product 118.

Customer 124 in this embodiment is given a chance to confirm product type indicator 132, either confirming or denying that produce product 118 is the type indicated by product type indicator 132. In this embodiment, product type indicator 132 indicates that produce product 118 is bananas, indicating that image recognition module 130 has correctly identified the bananas. If product type indicator 132 does not indicate the correct type of produce product 118, then customer 124 can deny product type indicator 132, and image recognition module 130 will try again. In the embodiment shown in FIG. 2 and FIG. 3, customer 124, via mobile computing device 134, send a product type confirmation 138 from mobile computing device 134 to computer processor 160, indicating that the product type indicator 132 is the correct product type for produce product 118. Computer processor 160 associates product type indicator 132 to digital image 122 in response to receiving product type confirmation 138 from mobile computing device 134.

Once computer processor 160 and image recognition module 130 receive product type confirmation 138 from mobile computing device 134, image recognition module 130 of computer processor 160 will perform further image processing on digital image 122 to determine a produce status of produce product 118. The produce status determination from digital image 122 can include many different status categories pertaining to produce product 118. In this embodiment, image recognition module 130 of computer processor 160 outputs a ripeness status indicator 136, which indicates whether produce product 118 is ripe, under-ripe, or over-ripe. Communication module 128 of computer processor 160 of produce weigh station 112 outputs ripeness status indicator 136 to both mobile computing device 134 and produce status station 126. In this embodiment, communication module 128 outputs ripeness status indicator 136 in response to receiving product type confirmation 138 from mobile computing device 134, but this is not meant to be limiting. In some embodiments, produce weigh station 112 will output ripeness status indicator 136 without receiving product type confirmation 138, such as when mobile computing device 134 does not communicate product type confirmation 138, or when computer processor 160 is programmed to not wait for product type confirmation 138.

In the embodiment shown in FIG. 2 and FIG. 3, produce weigh station 112 sends digital image 122 to both mobile computing device 134 and produce status station 126. In some embodiments, customer 124, through mobile computing device 134, can approve or disapprove digital image 122. In the embodiment of produce status station 126 shown in FIG. 2, monitor 158 is used to display both digital image 122 and ripeness status indictor 136. Employees of retail store 120 can view monitor 158 and determine the status of produce product 118 without having to physically be in produce sales department 144. In some embodiments, produce status station 126 can be a mobile device that can be carried by an employee wherever they go, allowing the employee to monitor the status of produce product 118 from wherever they are in retail store 120.

If an employee of retail store 120 determines from digital image 122 or ripeness status indicator 136, for example, that produce product 118 is over-ripe, as ripeness status indicator 136 in the embodiment shown in FIG. 2 shows, the employee can take action in response. For example, the employee may rearrange the produce product in produce sales department 144 in response to receiving ripeness status indicator 136 that indicates that produce product 118 is over-ripe. It is to be understood that many other type of actions and status indications are possible based on the status of the produce product determined by computer processor 160 and the actions that need to be taken in response.

It is to be understood that the produce status determination made by image recognition 130 can include many different types of produce status, not only ripeness status indicator 136. The produce status can include determinations relating to size, shape, and color of produce product 118. In some embodiments, image recognition module 130 of computer processor 160 outputs a produce size status indicator, which indicates whether produce product 118 is of the proper size, under-size, or over-size. In some embodiments, image recognition module 130 of computer processor 160 outputs a produce damage status indicator, which indicates whether produce product 118 is un-damaged or damaged. Damage can include holes, dents, tears, or other product damage. In some embodiments, the produce damage indicator is accompanied by a digital image of the damage. Thus, the produce status provided by computer processor 160 and sent to mobile computing device 134 and produce status station 126 can include communication relating to the size, color, ripeness, damage, or any other characteristic of produce product 118. These produce status considerations may depend on the product type indicator 132 in some embodiments For example, if it is detected that the product type indicator indicates tomatoes, then image processor 160 can be programmed to look for ripeness, size, and damage related to tomatoes.

Produce weigh station 112 also sends a produce product weight 140 and a produce product cost 142 to mobile computing device 134 in response to receiving product type confirmation 138 from mobile computing device 134. This allows customer 124 to enter produce product cost 142 into their electronic shopping cart if desired. When produce product cost 142 is entered into an electronic shopping cart of mobile computing device 134, a cashier at checkout registers 148 does not need to re-weigh produce product 118. Or, if customer 124 is going to electronically checkout and pay for their products, such as via the internet, produce product cost 142 can be included in the purchase and customer 124 does not even need to visit checkout registers 148. Computer processor 160 receives produce weight 140 from produce scale 114, and computes produce product cost 142 from produce product weight 140 once mobile computing device 134 confirms that product type indicator 132 is correct by sending product type confirmation 138 to produce weigh station 112.

Figure 4:
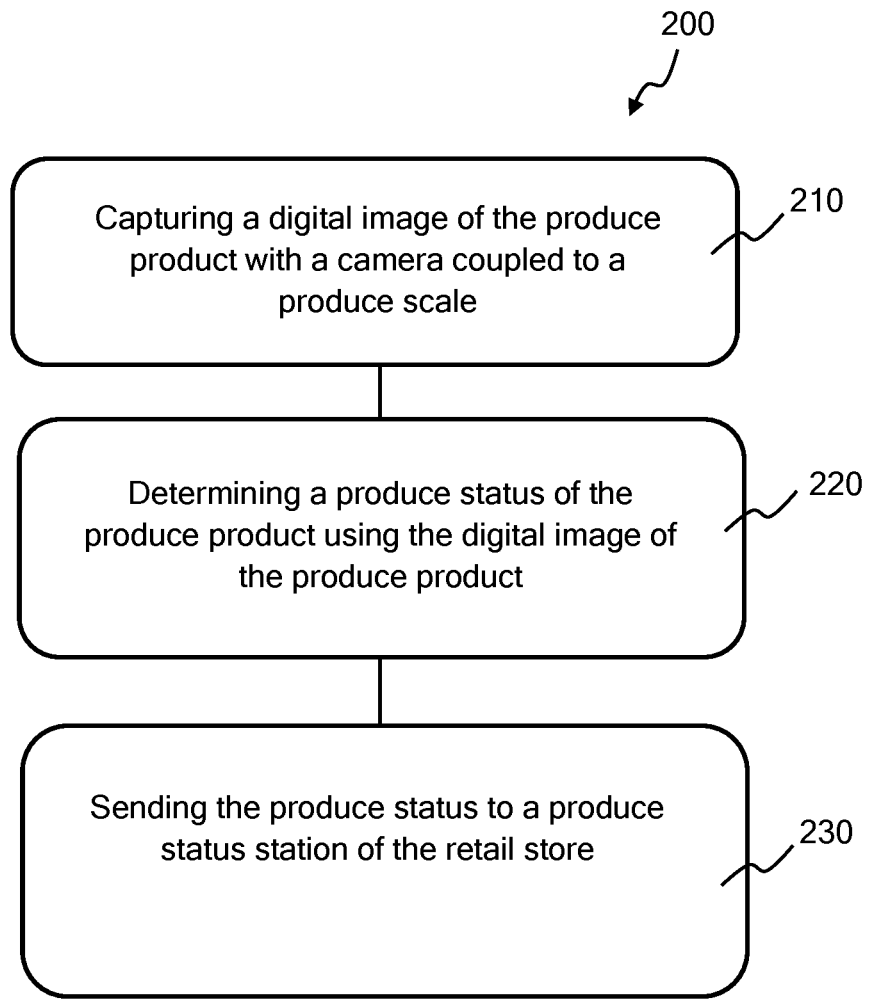
FIG. 4 illustrates a method of managing a produce product in a retail store.

FIG. 4 illustrates a method 200 of managing a produce product in a retail store. Method 200 of managing a produce product in a retail store includes an act 210 of capturing a digital image of the produce product with a camera coupled to a produce scale. Method 200 of managing a produce product in a retail store also includes an act 220 of determining a produce status of the produce product using the digital image of the produce product, and an act 230 of sending the produce status to a produce status station of the retail store. Method 200 can include many other acts.

In some embodiments, act 220 of determining a produce status of the produce product using the digital image of the produce product includes using the digital image of the produce product to determine whether the produce product is one of under-ripe, ripe, or over-ripe status.

In some embodiments, method 200 also includes an act of rearranging the produce product in a produce sales department in response to determining that the produce product is over-ripe. In some embodiments, method 200 also includes an act of determining a product type indicator of the produce product using the digital image of the produce product. In some embodiments, method 200 also includes an act of sending the digital image of the produce product and the product type indicator to a mobile computing device. In some embodiments, method 200 also includes an act of associating the product type indicator to the digital image of the produce product in response to receiving a product type confirmation from the mobile computing device. In some embodiments, method 200 also includes an act of communicating the produce status to the mobile computing device.

In some embodiments, method 200 also includes an act of determining, with the produce scale, a product weight of the produce product, computing a cost of the produce product using the product type indicator and the product weight; and communicating the cost of the produce product to the mobile computing device.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A produce weigh station in a retail store, the produce weigh station comprising:
   a computer processor having an image recognition module;
   a produce scale communicatively coupled to the computer processor, wherein the produce scale weighs a produce product; and
   a camera communicatively coupled to the computer processor, wherein the camera captures a digital image of the produce product being weighed by the produce scale when the produce product is placed on the produce scale;
   wherein the produce weigh station communicates with both a mobile computing device carried by a customer of the retail store and a produce status station of the retail store;
   wherein the computer processor outputs a product type indicator to the mobile computing device in response to the computer processor receiving the digital image;
   wherein the computer processor associates the product type indicator to the digital image in response to receiving a product type confirmation from the mobile computing device;
   wherein communication between the mobile computing device and the computer processor can be wired or wireless; and
   wherein the image recognition module performs image recognition processing on the digital image for determining ripeness of the produce product.

2. The produce weigh station of claim 1, wherein the computer processor outputs a ripeness status indicator of the produce product to the mobile computing device in response to the computer processor receiving the digital image of the produce product.

3. The produce weigh station of claim 2, wherein the computer processor outputs the ripeness status indicator in response to receiving the product type confirmation from the mobile computing device.

4. The produce weigh station of claim 3, wherein the produce weigh station outputs the ripeness status indicator to the produce status station.

5. The produce weigh station of claim 4, wherein the produce weigh station sends a product weight and a product price of the produce product to the mobile computing device in response to receiving the product type confirmation from the mobile computing device.

6. The produce weigh station of claim 5, wherein the produce weigh station sends the digital image to the mobile computing device.

\* \* \* \* \*